(12) United States Patent
Kim et al.

(10) Patent No.: US 8,089,598 B2
(45) Date of Patent: Jan. 3, 2012

(54) LIQUID CRYSTAL DISPLAY DEVICE HAVING DELAY COMPENSATION

(75) Inventors: Dong-gyu Kim, Yongin-si (KR); Byoung-sun Na, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 599 days.

(21) Appl. No.: 11/843,980

(22) Filed: Aug. 23, 2007

(65) Prior Publication Data

US 2008/0049156 A1   Feb. 28, 2008

(30) Foreign Application Priority Data

Aug. 25, 2006 (KR) .......... 10-2006-0081056
Dec. 8, 2006 (KR) .......... 10-2006-0124754
Feb. 15, 2007 (KR) .......... 10-2007-0015821

(51) Int. Cl.
  *G02F 1/1345* (2006.01)
  *G02F 1/1333* (2006.01)
  *G02F 1/136* (2006.01)
(52) U.S. Cl. ............ 349/149; 349/40; 349/46; 349/139; 349/152
(58) Field of Classification Search .......... None
  See application file for complete search history.

(56) References Cited

U.S. PATENT DOCUMENTS

| | | | | |
|---|---|---|---|---|
| 5,598,178 | A * | 1/1997 | Kawamori | 345/93 |
| 6,072,550 | A * | 6/2000 | Kim | 349/40 |
| 6,104,465 | A * | 8/2000 | Na et al. | 349/152 |
| 7,206,057 | B2 * | 4/2007 | Yoo et al. | 349/156 |
| 7,209,192 | B2 * | 4/2007 | Lee et al. | 349/39 |
| 2003/0227078 | A1 * | 12/2003 | Chang | 257/693 |
| 2004/0114059 | A1 | 6/2004 | Lee et al. | |
| 2004/0135956 | A1 | 7/2004 | Kim et al. | |
| 2005/0018121 | A1 | 1/2005 | Jen et al. | |
| 2005/0179631 | A1 | 8/2005 | Lyu | |
| 2006/0001640 | A1 * | 1/2006 | Lee | 345/100 |
| 2006/0066792 | A1 * | 3/2006 | Oh et al. | 349/123 |
| 2006/0114209 | A1 | 6/2006 | Kim et al. | |
| 2006/0186913 | A1 * | 8/2006 | Kim | 324/770 |
| 2006/0208658 | A1 * | 9/2006 | Kim | 315/169.3 |
| 2006/0286703 | A1 * | 12/2006 | Um et al. | 438/30 |
| 2007/0080433 | A1 * | 4/2007 | Lai | 257/666 |
| 2007/0085963 | A1 * | 4/2007 | Huang et al. | 349/152 |

FOREIGN PATENT DOCUMENTS

EP   1 674 922 A1   6/2006

(Continued)

OTHER PUBLICATIONS

European Application No. EP07166446.7, Examination Report, Apr. 26, 2010, 9 pp.

(Continued)

*Primary Examiner* — Michelle R Connelly Cushwa
(74) *Attorney, Agent, or Firm* — Innovation Counsel LLP

(57) ABSTRACT

A liquid crystal display device includes: a first substrate having a display region; a second substrate facing the first substrate; and a liquid crystal layer disposed between the first substrate and the second substrate, the first substrate comprising: a gate main line which is disposed in the display region; a gate pad which is disposed out of the display region; and a ballasting resistor which electrically connects the gate main line and the gate pad, and comprises a material having a larger resistivity than that of a predominant conductive material defining the gate main line.

17 Claims, 23 Drawing Sheets

FOREIGN PATENT DOCUMENTS

| | | | |
|---|---|---|---|
| EP | 1674922 A1 | * | 6/2006 |
| JP | 63-198022 | | 8/1988 |
| JP | 63198022 A | * | 8/1988 |
| JP | 04-313733 | | 11/1992 |
| JP | 04313733 A | * | 11/1992 |
| JP | 07-218896 | | 8/1995 |
| JP | 07218896 A | * | 8/1995 |
| JP | 2004125895 A | * | 4/2004 |

OTHER PUBLICATIONS

European Application No. EP0716646.7, Search Report, Apr. 26, 2010, 12 pp.

* cited by examiner

GATE OUTER
CIRCUMFERENCE

_US 8,089,598 B2_

LIQUID CRYSTAL DISPLAY DEVICE HAVING DELAY COMPENSATION

CROSS-REFERENCE TO RELATED APPLICATIONS

This application claims priority from Korean Patent Application No. 10-2006-0081056, filed on Aug. 25, 2006, Korean Patent Application No. 10-2006-0124754, filed on Dec. 8, 2006 and Korean Patent Application No. 10-2007-0015821, filed on Feb. 15, 2007, in the Korean Intellectual Property Office, the disclosures of which are incorporated herein by reference.

BACKGROUND

1. Field of Invention

The present disclosure of invention relates to a liquid crystal display (LCD) device, and more particularly, to a liquid crystal display device in which delay differences of gate signal transmission paths are reduced and brightness uniformity is thereby improved.

2. Description of Related Art

A typical liquid crystal display device includes a first substrate (TFT-containing substrate) which has a plurality of thin film transistors (TFT's), a second substrate (common electrode substrate) which is in spaced apart facing relation with the first substrate and a liquid crystal material layer which is disposed between the first and second substrates.

Pixel areas of the TFT-containing substrate (first substrate) are typically defined as rectangular areas having corners located at or near where a corresponding gate line and a data line disposed in the TFT substrate cross each other. Light transmission through each pixel area is typically controlled by a thin film transistor (TFT) having its gate connected to the gate line, its source connected to the data line and its drain connected to a corresponding pixel-electrode of the pixel area. When a pixel-activating gate signal, i.e., a gate turn-on voltage (Von), is supplied to the gate line, the thin film transistor is turned on and a data voltage (Vd) appearing at its source is charged to the pixel electrode through the conductive channel region of the TFT.

An electric field which is formed due to the difference between a pixel voltage Vp appearing on the pixel electrode and a common voltage Vcom appearing on the spaced apart common electrode of the second substrate, drives the liquid crystal material in between to a corresponding optical orientation. In some embodiments, the polarity of the data voltage Vd supplied on the data lines flips with every frame or with predefined numbered ones of frames so as to reduce undesired effects of unidirectional current flow.

A number of factors can cause the Vp voltage appearing on the pixel-electrode to be different than the Vd voltage supplied on the data lines. So-called Miller capacitances or parasitic capacitances, Cp are often present between the gate of each TFT and each of its source and drain electrodes. The rising and falling edges of the data voltage pulse, Vd supplied to the pixel areas via the TFT are stunted (caused to change more slowly) due to negative feedback through the parasitic capacitances Cp, thereby causing a different pixel voltage, Vp to appear on the charged pixel-electrode as compared to the Vd magnitude of the data voltage pulse appearing on the data line. The difference between the magnitude of data voltage Vd supplied on the data line and the pixel voltage Vp developed on the pixel-electrode is referred to as a kick back voltage, Vkb.

Another factor that affects the pixel-electrode voltage, Vp is the magnitude of the gate turn-on voltage applied to the gate of the TFT. In one class of embodiments, the gate line receives its gate signal from a wider gate signal origination pad, where multiple pads crowd together in a region where a corresponding driving chip (integrated circuit chip) may be disposed and each gate line functions as a separate signal transmission strip for coupling the gate signal from its IC connection pad to individual TFT's distributed along each gate line. Pixel areas which are positioned closer to their respective gate distribution pad generally receive a short-delayed gate signal (delayed due to RC factors) while pixel areas which are positioned farther from the gate pad receive a longer-delayed gate signal due to the cumulative resistance (R) and/or other transmission line effects (i.e., C and/or L) of the gate line.

The size of the kick back voltage Vkb depends, among other things, on the delay-producing cumulative resistance of the gate signal. The resulting pixel voltage, Vp is affected by the variation of the kick back voltage Vkb, thereby causing irregular brightness in an image due to distance of pixel area from its corresponding gate signal originating pad. These effects may cause undesirable degradation of image quality.

SUMMARY

One embodiment of the present disclosure provides a liquid crystal display device which reduces brightness irregularity due to delay differences between gate signals.

Additional aspects and/or advantages of the disclosure will be set forth in the detailed description which follows. According to one aspect of the disclosure, a delay ballasting resistor is provided where the resistor includes a same material as that used to form the light-transmitting pixel electrode. More specifically in one embodiment, the delay ballasting resistor includes indium tin oxide (ITO) or indium zinc oxide (IZO).

According to another aspect of the disclosure, the delay ballasting resistor has a smaller resistance value if a distance between the gate and the gate pad as measured along a gate main line and fan-out line connected by the resistor to the gate becomes larger and a greater resistance value if the separation distance is smaller.

According to another aspect of the disclosure, the liquid crystal display device further includes a signal fan-out part which is disposed between the gate pad and the delay ballasting resistor.

According to another aspect of the disclosure, the gate main line, the gate pad and the fan-out part are formed as parts of a same layer.

According to an aspect of the disclosure, the first substrate further includes an electrostatic bar which crosses a gate outer circumference, the gate outer circumference disposed out of the resistor and having the gate pad and the gate fan-out part, and an anti-static diode which is electrically connected with the gate outer circumference and the electrostatic bar.

According to an aspect of the disclosure, the first substrate further includes a storage electrode line which is formed within the display region and is elongated in parallel with the gate main line, and a common voltage line which is formed out of the display region and crosses the gate circumference, and supplies a common voltage to the storage electrode line, and the electrostatic bar includes the common voltage line.

According to an aspect of the invention, the anti-static diode includes a first anti-static diode which has the gate outer circumference as a control terminal and an input terminal, and the electrostatic bar as an output terminal, and a second anti-static diode which has the gate outer circumference as an output terminal, and the electrostatic bar as a control terminal and an input terminal.

According to an aspect of the invention, the liquid crystal display device further includes a sealant which is formed on the fan-out part and combines the first substrate and the second substrate.

According to an aspect of the invention, the liquid crystal display device further includes a fan-out part which is disposed between the gate pad and the resistor.

According to an aspect of the invention, the gate pad, the fan-out part and the resistor are formed as the same layer.

According to an aspect of the invention, at least a part of the resistor has a zigzag pattern.

According to an aspect of the invention, the liquid crystal layer is a vertical alignment mode.

According to an aspect of the invention, the pixel electrode includes a pixel electrode cutting pattern and the second substrate includes a common electrode which is formed with a common electrode cutting pattern.

According to an aspect of the invention, the pixel electrode includes a first pixel electrode and a second pixel electrode which are separated from each other, and the first and second pixel electrodes receive different pixel voltages.

According to an aspect of the invention, the thin film transistor includes a drain electrode which includes a first drain electrode supplying a data voltage directly to the first pixel electrode and a second drain electrode forming a coupling capacitance together with the second pixel electrode.

According to an aspect of the invention, the thin film transistor includes a first thin film transistor which is connected with the first pixel electrode and a second thin film transistor which is connected with the second pixel electrode.

According to an aspect of the invention, a total resistance of the resistor is 10% to 50% of a total resistance of the gate main line.

According to an aspect of the invention, a variation of a gate signal delay in the gate main line occurs within 100%.

The foregoing and/or other aspects of the present invention can be achieved by providing a liquid crystal display device including: a first substrate having a display region; a second substrate facing the first substrate; and a liquid crystal layer disposed between the first substrate and the second substrate, the first substrate including: a gate main line which is disposed in the display region; a gate pad which is disposed out of the display region; a resistor which electrically connects the gate main line and the gate pad, and includes a material having a larger resistance than the gate main line; a thin film transistor which is connected with the gate main line; and a pixel electrode which is electrically connected with the thin film transistor and includes a same material as the resistor, the liquid crystal layer is a vertically aligned (VA) mode.

The foregoing and/or other aspects of the present invention can be achieved by providing a thin film transistor array substrate, including: a substrate which has a display region and a non-display region; a gate main line which is disposed in the display region; a gate pad which is disposed out of the display region; a resistor which electrically connects the gate main line and the gate pad and includes a material having a larger resistance than the gate main line; a thin film transistor which is connected with the gate main line; and a pixel electrode which is electrically connected with the thin film transistor and includes a same material as the resistor.

BRIEF DESCRIPTION OF THE DRAWINGS

The above and/or other aspects and advantages of the disclosure will become more readily appreciated from the following detailed description taken in conjunction with the accompanying drawings of which.

DETAILED DESCRIPTION OF EMBODIMENTS

Hereinafter, embodiments in accordance with the disclosure will be described with reference to accompanying drawings, wherein like numerals often refer to like elements and repetitive descriptions may then be avoided where practical.

Hereinafter, discussion regarding forming a first film (i.e., a layer) "on" or "above" a second film (i.e., a layer) is to be understood as covering situations where a third layer is disposed between the two films (i.e., layers) as well as that where the two films (i.e., layers) directly contact each other.

Figure 1:
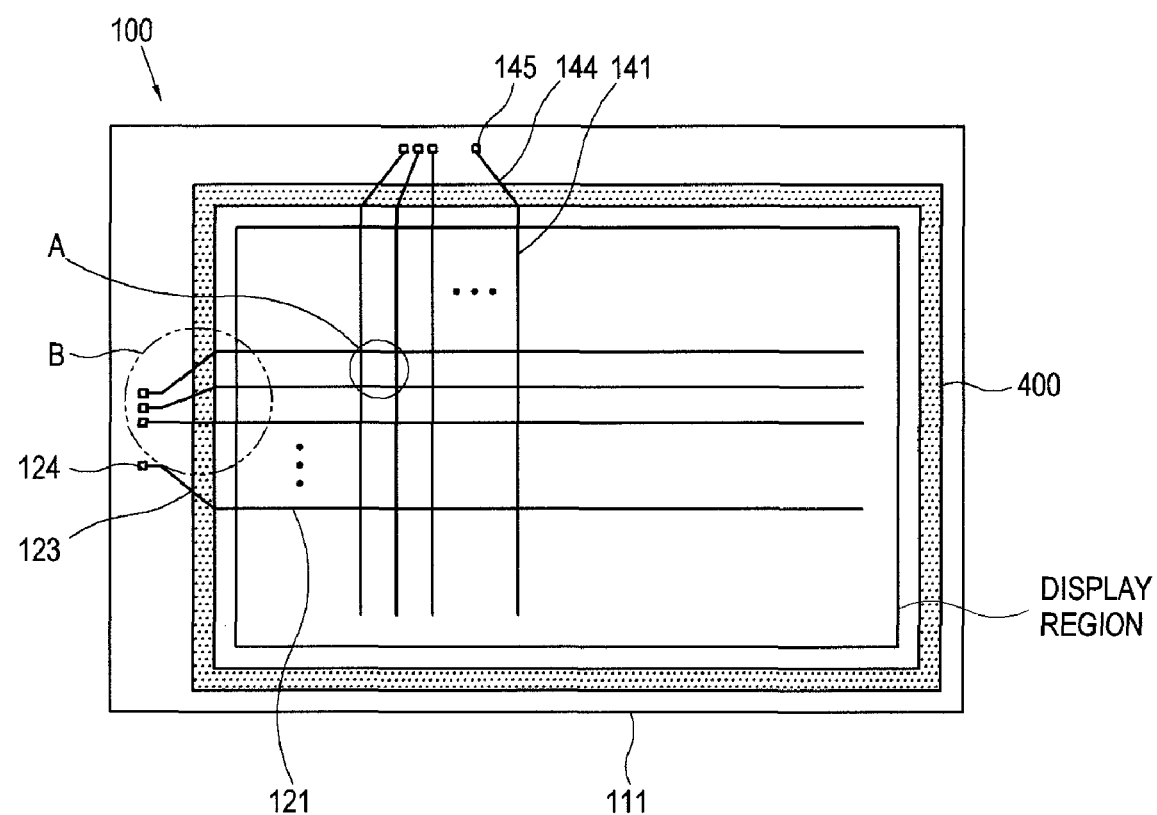
FIG. 1 illustrates plan view of a first substrate in a liquid crystal display device according to a first embodiment.
Figure 2:
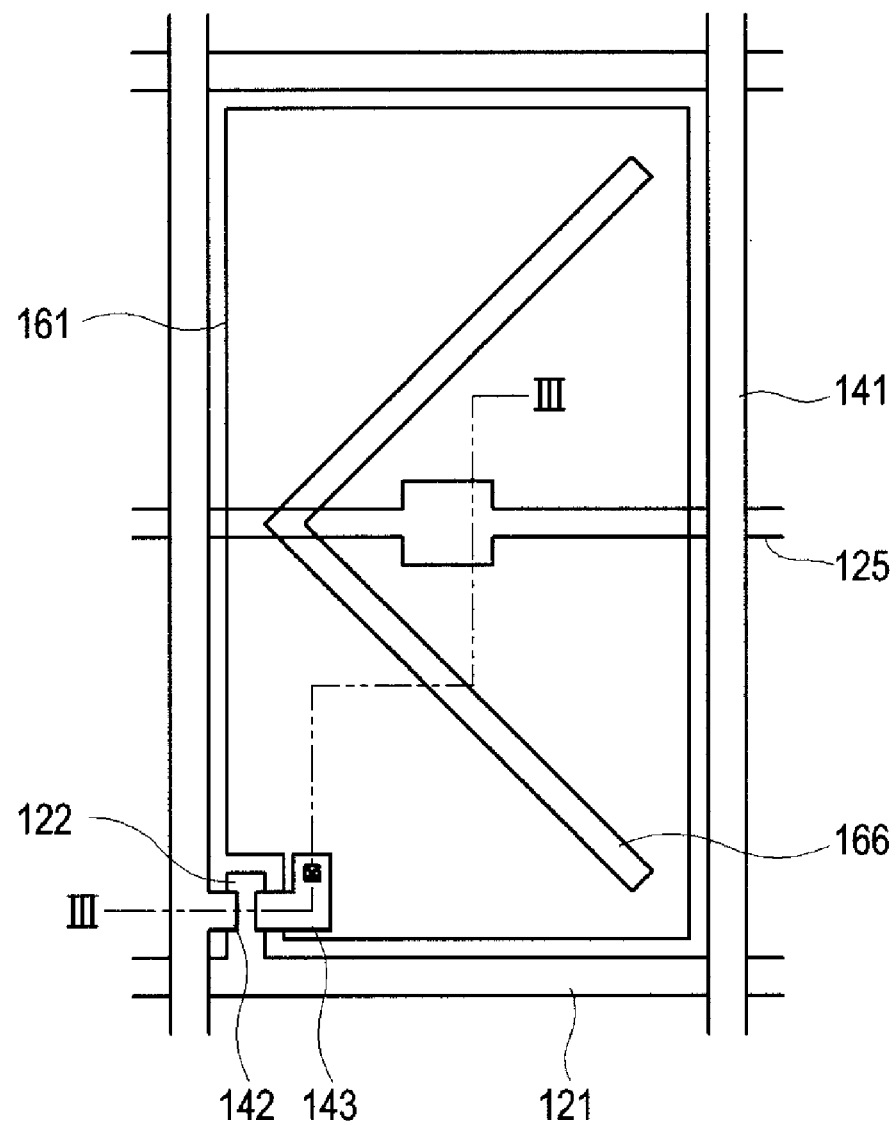
FIG. 2 is an enlarged view of a part A in FIG. 1 according to the first embodiment.

A liquid crystal display device according to the present disclosure will be described with reference to FIGS. 1 to 3.

A liquid crystal display device 1 (FIG. 3) includes a first substrate 100 which has a thin film transistor T, a second substrate 200 which is spaced apart from and faces the first substrate 100, a liquid crystal material layer 300 which is disposed between the first and second substrates 100 and 200 and a sealant ring 400 (FIG. 1) which sealably joins the first and second substrates 100 and 200 to one another in spaced apart relation.

The first substrate 100 includes a display region and a non-display region which surrounds the display region. A gate main line 121 of the display region is connected with a gate pad 124 through a fan-out part 123 of the non-display region.

Hereinafter, the first substrate 100 according to the first embodiment will be described.

A gate signal is transmitted from a signal origination pad (e.g., IC connection pad, see 124 of FIG. 7) to gate electrode over a gate wire where the latter wire is formed on a first insulating substrate 111. The gate wire may include a single or plural metal layers. The gate wire generally includes the gate main line 121 which is disposed in the display region and extends transversely, the gate electrode 122 which is connected with the gate main line 121, the fan-out part 123 which extends from the gate main line 121 to the non-display region, and the gate pad 124 which is connected with an end part of the fan-out part 123. A storage electrode line 125 often extends in parallel with the gate main line 121 as seen for example in FIG. 2.

The gate signal origination pad 124 is often connected with a packaging terminal or IC pin of a gate driver circuit (not shown) that outputs the gate signal to the pad end of the gate wire. The gate pad 124 has a substantially wider width than the gate main line 121 that connects that signal sourcing pad 124 to the gates of TFT's distributed along the gate main line 121.

A gate insulating layer 131 which in one embodiment is made of a silicon nitride ($SiN_x$) overlaps the gate electrode 122 and the gate wire 121 where the latter (121, 122) are disposed on the first insulating substrate 111.

A semiconductor layer 132 which in one embodiment includes amorphous silicon (a-Si) is formed on the gate insulating layer 131 overlapping the gate electrode 122. An ohmic contact layer 133 which in one embodiment includes n+hydrogenated amorphous silicon highly doped with an n-type dopant is formed on the semiconductor layer 132. The ohmic contact layer 133 is selectively removed (etched away) from a channel between a source electrode 142 and a drain electrode 143 of the TFT (T).

A data carrying wire is formed to extend over the drain's ohmic contact layer 133 and on top of the gate insulating layer 131. The data wire may include a single or multiple layers of metal. The data wire includes a data line 141 which is shown extending vertically in FIG. 2 and crosses the gate main line 121 at a corner portion of the pixel area. The source electrode 142 branches out from the data line 141 and extends over the ohmic contact layer 133. The drain electrode 143 which is separated from the source electrode 142, extends over the ohmic contact layer 133 opposite to the source electrode 142. A fan-out part 144 of the source line extends from the data main line 141 to the non-display region and a data drive pad 145 (belonging to a data driving circuit or IC, not shown) which is connected with an end of the fan-out part 144.

The data pad 145 is connected with a data driver circuit (not shown) and receives a data driving signal. The data pad 145 has a wider width than the data main line 141.

Figure 7:
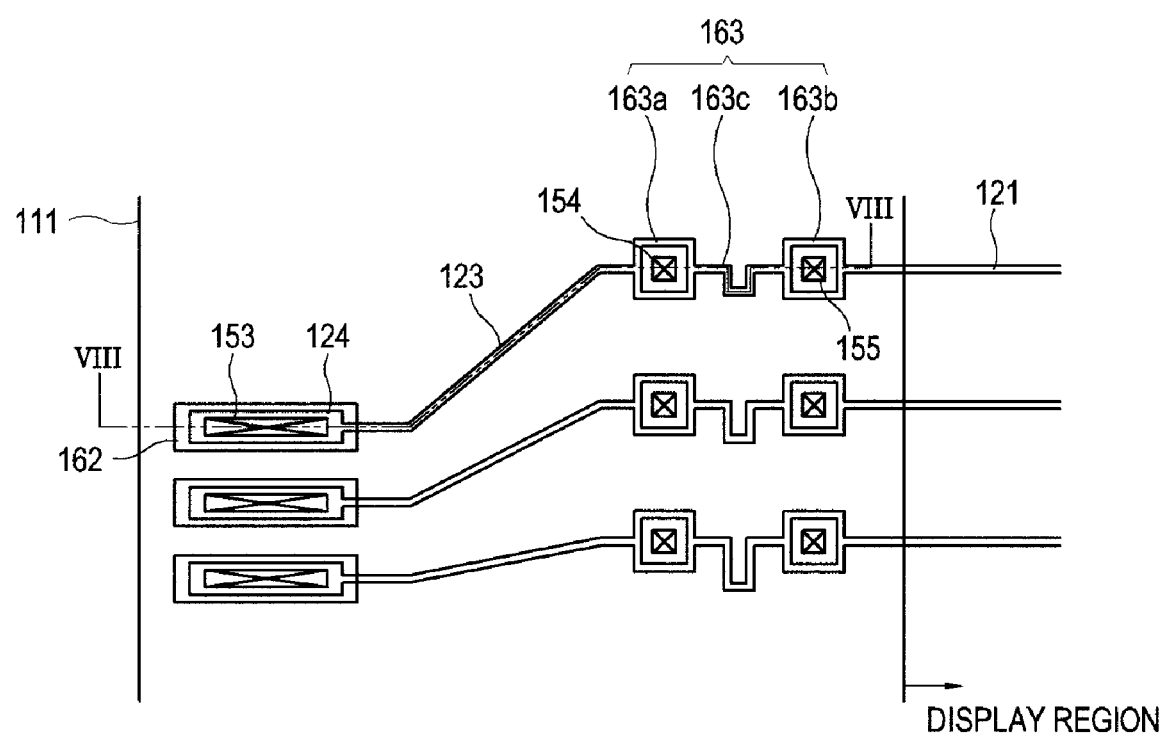
FIG. 7 is an enlarged view of a part B in FIG. 1 according to the first embodiment.
Figure 8:
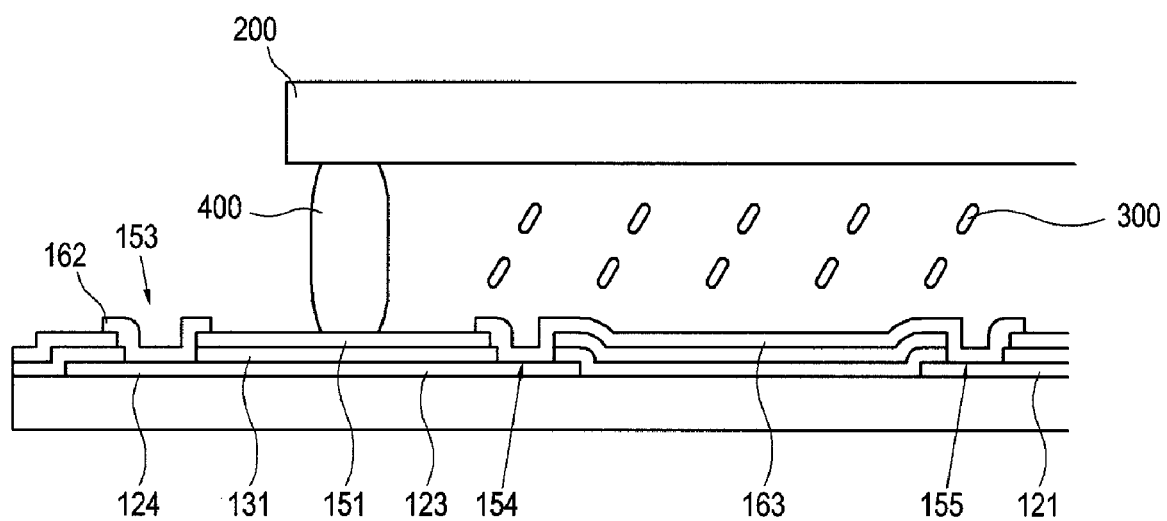
FIG. 8 is a sectional view, taken along line VIII-VIII in FIG. 7.

A passivation layer 151 is formed on the data wire and the semiconductor layer 132 that is not covered by the data wire. A contact hole 152 is formed on the passivation layer 151 to expose the drain electrode 143 therethrough. As shown in FIGS. 7 and 8, contact holes 153, 154 and 155 are also formed on the passivation layer 151. The gate insulating layer 131 is removed from the contact holes 153, 154 and 155.

A pixel electrode 161 is formed on the passivation layer 151. The pixel electrode 161 is typically made of a transparent conductive material such as indium tin oxide (ITO), indium zinc oxide (IZO), etc. The pixel electrode 161 is connected with the drain electrode 143 through the contact hole 152. A pixel electrode splitting pattern 166 is defined (cut through) the pixel electrode 161 as shown.

The pixel electrode cutting pattern 166 of the pixel electrode 161 divides the liquid crystal layer 300 into a plurality of regions, together with a common electrode cutting pattern 252 (to be described later).

Hereinafter, the second substrate 200 of the liquid crystal display device 1 according to the first embodiment will be described.

A black matrix 221 is formed on a second insulating substrate 211. The black matrix 221 generally outlines a corresponding red, green or blue filter 231 and blocks light from being directly emitted through the area of the underlying thin film transistor (T) of the first substrate 100. The black matrix 221 may include a photoresist organic material added with a black pigment. The black pigment may include carbon black or titanium oxide.

A color filter 231 may include a bandpassing optical material such as one of red, green and blue filters that are repeatedly formed between areas of the black matrix 221. The color filter 231 assigns color to light emitted from a backlight unit (not shown) and traveling through the liquid crystal layer 300. The color filter 231 typically includes a photoresist organic material.

An overcoat, planarizing layer 241 is typically formed on the color filter 231 and the black matrix 221. The overcoat layer 241 provides planar surface even though the filter and matrix are of different thicknesses and the overcoat layer 241 protects the color filter 231. The overcoat layer 241 may include a photoresist acrylic resin.

A common electrode 251 is formed on the overcoat layer 241. The common electrode 251 includes a transparent conductive material such as indium tin oxide (ITO), indium zinc oxide (IZO), etc. The common electrode 251 supplies a voltage to one side of the liquid crystal material layer 300, while the pixel electrode 161 of the thin film transistor substrate provides a second voltage to the other side so as to establish one or more electric filed patterns through the liquid crystal material layer 300.

The common electrode cutting pattern 252 is formed on the common electrode 251. The common electrode cutting pattern 252 divides the liquid crystal layer 300 into a plurality of regions together with the pixel electrode cutting pattern 166 of the pixel electrode 161. The pixel electrode cutting pattern 166 and the common electrode cutting pattern 252 are not limited to the V-shaped ones illustrated for the first embodiment, and may be, otherwise, formed in various shapes. In another embodiment of the present disclosure, a protrusion may be provided to divide the liquid crystal layer 300 into a plurality of regions instead of the cutting patterns 166 and 252.

The liquid crystal layer 300 is disposed between the first and second substrates 100 and 200. In one embodiment, the liquid crystal material layer 300 is a vertically aligned (VA) mode, in which a long axis of liquid crystal molecules is perpendicular to the first and second substrates 100 and 200 if not receiving a voltage. When receiving a driving voltage, the long axis of the liquid crystal molecules shift to lie in a vertical direction with respect to an electric field due to negative dielectric anisotropy.

If the cutting patterns 166 and 252 are not formed, the liquid crystal molecules may lie irregularly in all directions since the lying direction is not determined by boundary conditions, thereby creating a disclination line on a boundary between different lying directions. The cutting patterns are organized 166 and 252 to form a fringe electric field when a voltage is supplied to the liquid crystal layer 300 and to thereby determine the lying direction of the liquid crystal molecules. The liquid crystal layer 300 is divided into plural regions by the cutting patterns 166 and 252.

Figure 4:
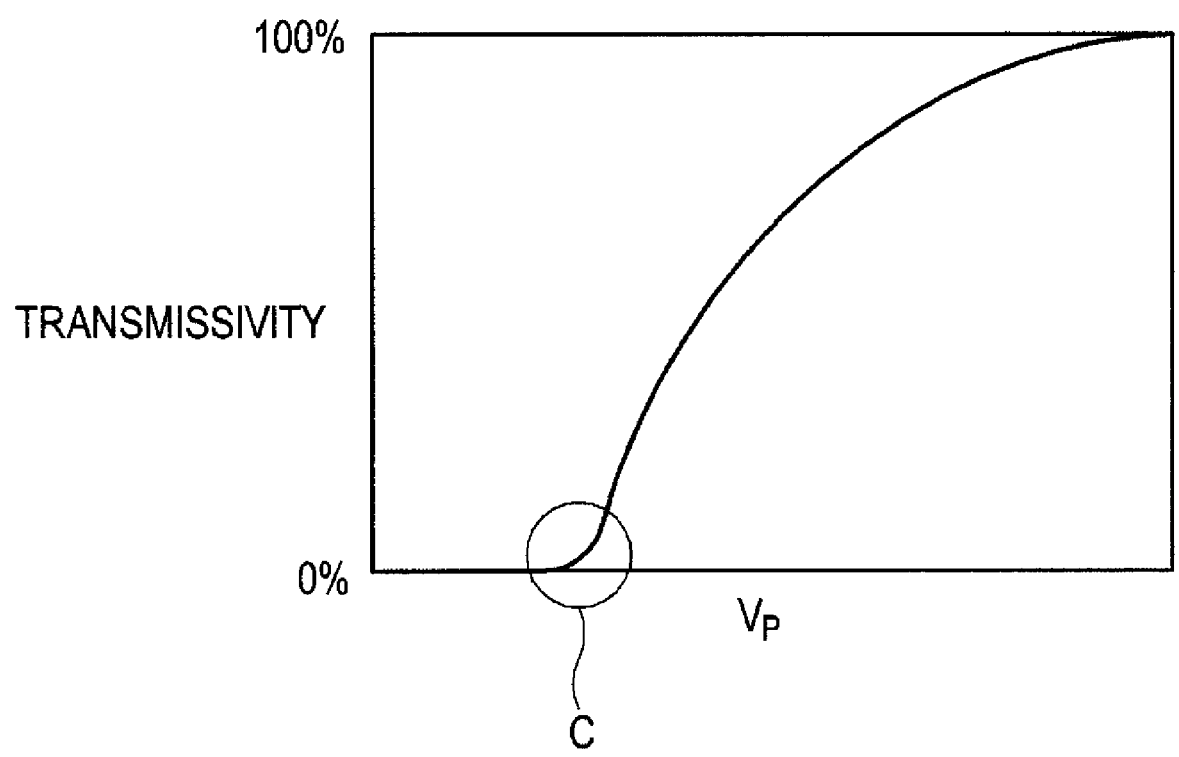
FIG. 4 graphs a transmissivity attribute as a function of pixel voltage in the liquid crystal display device according to the first embodiment.

The liquid crystal display device 1 according to the first embodiment has a normally black mode when no substantial voltage is applied across the liquid crystal material, and a transmissivity that is a function of the pixel voltage as is illustrated in the plot of FIG. 4. The transmissivity variation in a low gradation shown in a part C in FIG. 4 is three times more drastic for the VA material than a twisted nematic liquid crystal.

In the liquid crystal display device 1 according to the first embodiment, the gate main line 121 receives a gate signal through the gate pad 124 connected with the end part thereof. Due to a resistance of the gate main line 121, the thin film transistor T adjacent to the gate pad 124, i.e., a left thin film transistor T receives a short-delayed gate signal but the thin film transistor T far from the gate pad 123, i.e., a right thin film transistor T receives a longer-delayed gate signal.

Variations in image brightness depending on delay differences of the gate signals are described with reference to FIGS. 5 to 6C.

The kick back voltage Vkb may be expressed by a formula 1 as follows.

$$V_{kb}=(V_{on}-V_{off})*C_p/(C_{lc}+C_{st}+C_p)$$ Formula 1

Figure 3:
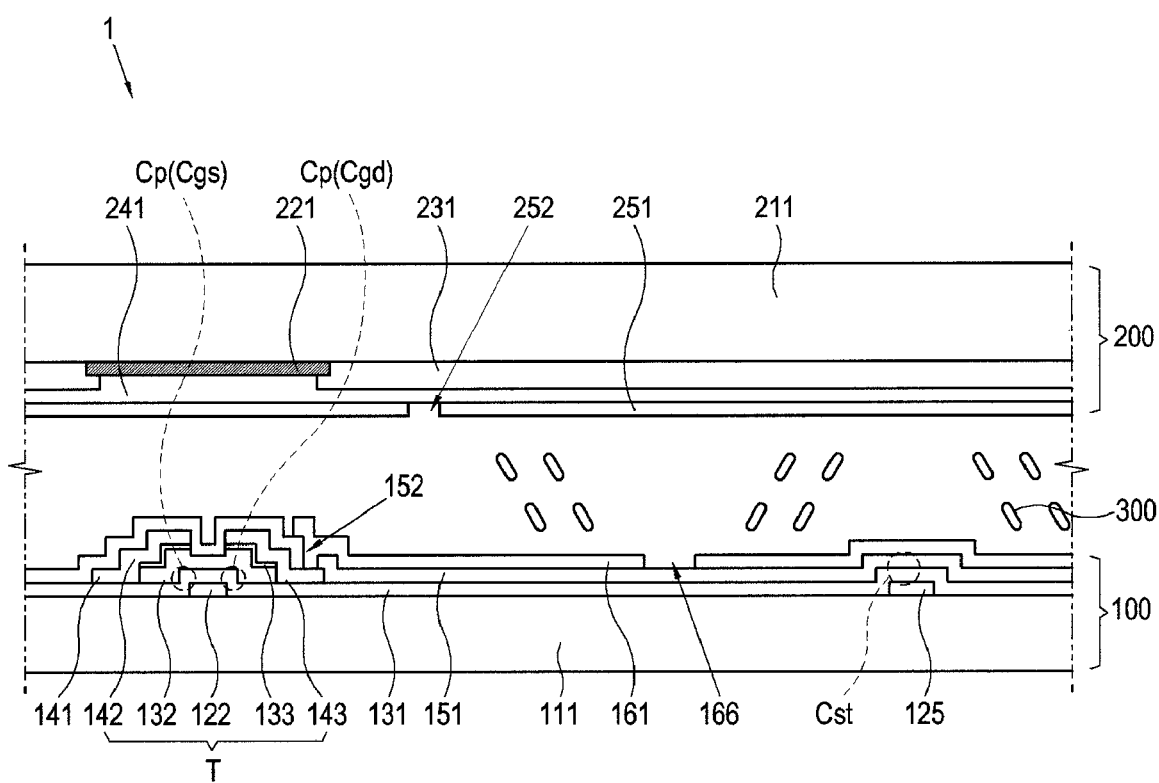
FIG. 3 is a sectional view, taken along III-III in FIG. 1.
Figure 5:
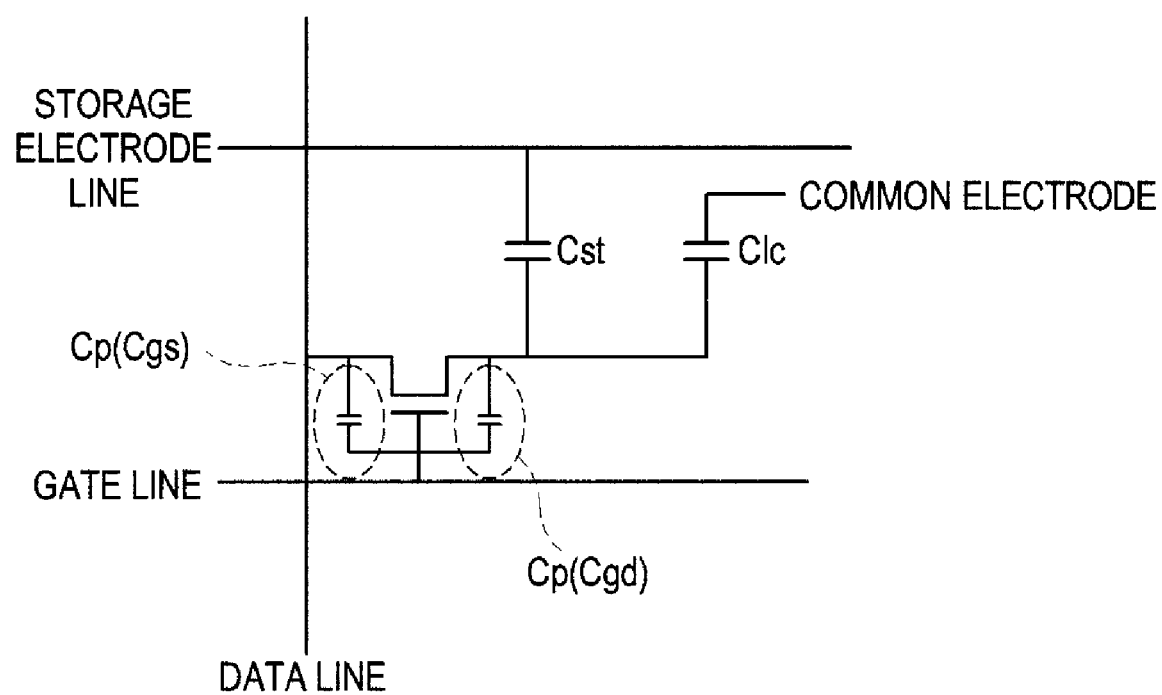
FIG. 5 shows a schematic of an equivalent circuit of a pixel of the liquid crystal display device according to the first embodiment.

As shown in FIGS. 3 and 5, Cp refers to combined parasitic capacitance Cgs between the gate electrode and the source electrode and a parasitic capacitance Cgd between the gate electrode and the drain electrode, Clc is a liquid crystal capacitance, Cst is a storage capacitance, Von is a gate on voltage and Voff means a gate turn-off voltage.

If the gate signal is delayed longer relative to a data pulse on the data line, the gate-on voltage (Von) is not supplied in time, thereby decreasing the kick back voltage Vkb. The kick back voltage Vkb becomes larger when a negative pixel voltage is supplied rather than when a positive pixel voltage is supplied.

Figure 6A:
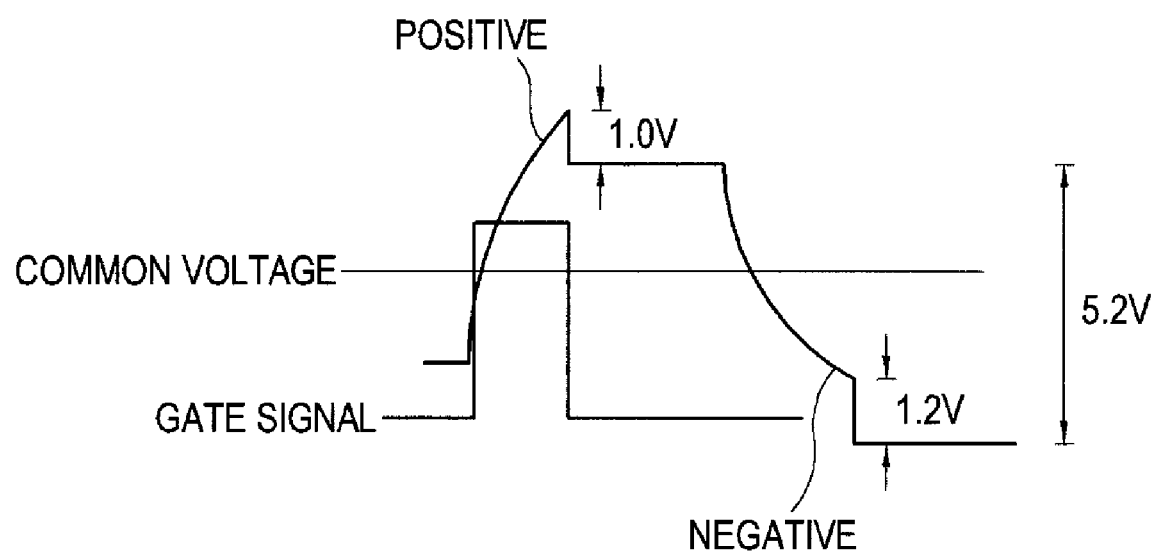
FIGS. 6A to 6C illustrate brightness irregularity due to delayed gate signals.
Figure 6B:
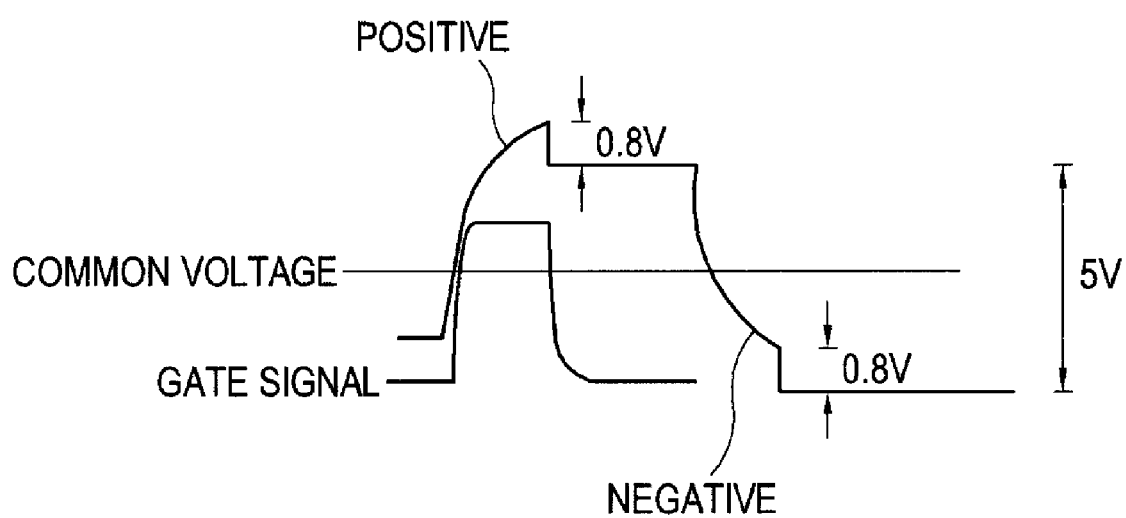

FIGS. 6A and 6B respectively illustrate a kick back voltage Vkb of a pixel in a left-side display region having a short-delayed gate signal, and a pixel in a right-side display region having a longer-delayed gate signal.

Regarding the left-side pixel in FIG. 6A, the kick back voltage is about 1.0V when the positive pixel voltage is supplied while it is about 1.2V when the negative pixel voltage is supplied. Concerning the right-side pixel in FIG. 6B, the kick back voltage is about 0.8V when both the positive pixel voltage and the negative pixel voltage are supplied.

As a result, the left-side pixel has a larger root mean square pixel voltage that remains ultimately, and an image corresponding to the left-side pixel is seen as being comparatively brighter.

Figure 6C:
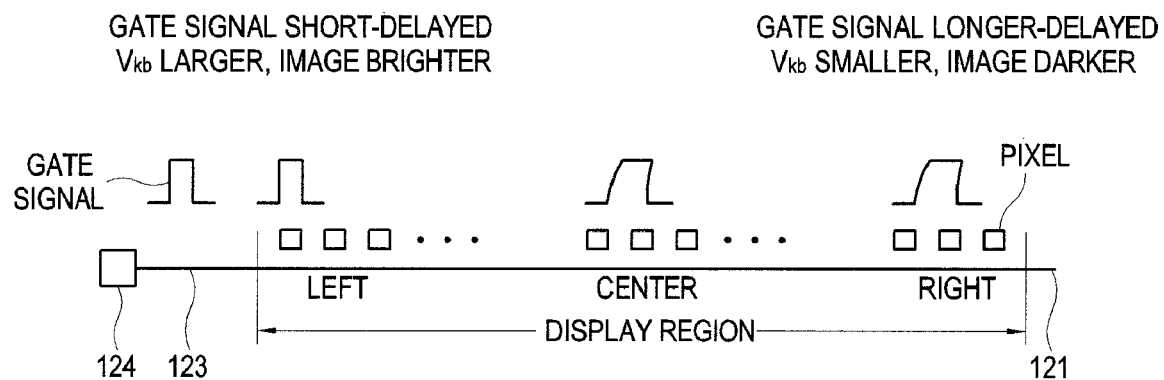

As shown in FIG. 6C, the gate signal is shorter-delayed and the kick back voltage Vkb becomes larger if they are closer to the gate pad 124. Conversely, the gate signal is longer-delayed and the kick back voltage Vkb becomes smaller if they are farther from the gate pad 124. Thus, the left-side pixel has a larger root mean square pixel voltage than the right pixel to brighten the image corresponding to the left pixel more than that corresponding to the right pixel.

As described above, brightness is different from left and right sides, thereby sometimes showing as an unintended vertical line. Such a problem is more serious in a large-sized liquid crystal display device which has a long gate main line 121 and causes a longer-delayed gate signal.

Referring to FIG. 7, the liquid crystal display device 1 according to the first embodiment of the present disclosure provides a compensating resistor 163 disposed between the gate main line 121 and the fan-out line 123 (and the gate pad 124) to reduce the above-mentioned problem.

Figure 9:
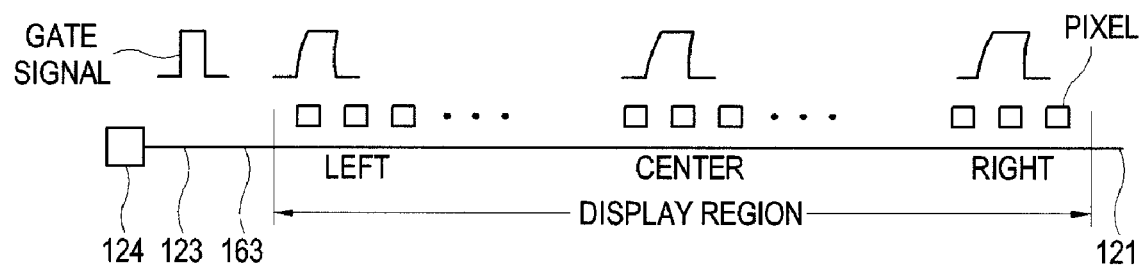
FIG. 9 illustrates an improvement of brightness irregularity in the liquid crystal display device according to the first embodiment.

Hereinafter, the resistor 163 of the liquid crystal display device 1 according to the first embodiment will be described with reference to FIGS. 7 to 9.

The resistor 163 is disposed between the fan-out part 123 and the gate main line 121 in the non-display region. The primary resistive material of resistor 163 is provided by the same layer that provides the primary material of the pixel electrode 161. The resistor 163 includes a first part 163a which is connected with the fan-out part 123, a second part 163b which is connected with the gate main line 121 and a third part 163c which is electrically disposed between the first and second parts 163a and 163b.

The first part 163a contacts the fan-out part 123 through the contact hole 154. The second part 163b contacts the gate main line 121 through the contact hole 155.

The gate pad 124 exposed by the contact hole 153 is covered by a contact member 162, where member 162 is comprised of the same material as that of the pixel electrode 161 and where member 162 is disposed in the same layer with the pixel electrode 161.

The resistor 163 can include one or more of optically transmissive electrical conductors such as indium tin oxide (ITO), indium zinc oxide (IZO), etc., which have a larger resistance than an optically opaque electrical conductor such as the metal material used in the gate main line 121. Due to the resistor 163 having a substantially large resistance, the gate signal is substantially delayed before entering the display region, as shown in FIG. 9 and the difference in delay as shown by FIGS. 6A-6B is no longer a substantial factor in determining kick back.

Thus, the scope of delay differences between gate signals and the variation of the kick back voltage are reduced. Also, the brightness differences between the left and right sides of the display region decreases.

In one class of embodiments, total resistance of the gate main line 121 is typically 4000Ω to 7000Ω while a total resistance of the resistor 163 may be 10% to 50% of the total resistance of the gate main line 121. The resistance value of the resistor 163 may vary by changing one or more of a thickness, width and length attribute of the resistor 163.

It is preferable but not necessary that the resistance value of the resistor 163 be set so that the gate signal delay variation due to resistance of the main gate line is substantially less than gate signal delay to total wire resistance. In other words, the gate signal delay value of a far right pixel of the display region is no more than about twice the gate signal delay value of the far left pixel in the display region (the one closest to the gate signal originating pad 124.

The distance between the gate main line 121 and the gate pad 124 is various, thereby causing a different resistance therebetween and irregular brightness.

The length of the third part 163c in the resistor 163 is in inverse proportion to the distance between the corresponding gate main line 121 and the gate pad 124. Thus, brightness irregularity due to variation in distance between the gate main line 121 and the gate pad 124 decreases.

As seen in FIG. 8, the sealant 400 is disposed on the fan-out part 123 while the resistor 163 is provided inside the liquid crystal material containing area of the sealant 400. Because the resistor 163 is not exposed to the outside, it is safe from being corroded.

During a manufacturing process, a flow of static electricity from the outside may damage the thin film transistor T. According to the first embodiment, a substantial portion of the energy of the static electricity flow introduced from the gate pad 124 is dissipated in the resistor 163 having the larger resistance, thereby reducing problems due to static electricity.

A resistor 163 according to another embodiment of the present disclosure may include other materials having a larger resistance than the gate main line 121 and being different from the material of the pixel electrode 161. In another embodiment of the present disclosure, the shape of the resistor 163 is identical and the distance differences between the gate main line 121 and the gate pad 124 may be dealt with by changing the shape of the fan-out part 123.

Hereinafter, the reason why the gate signal delay is adjusted to improve the brightness irregularity will be described.

Figure 10:
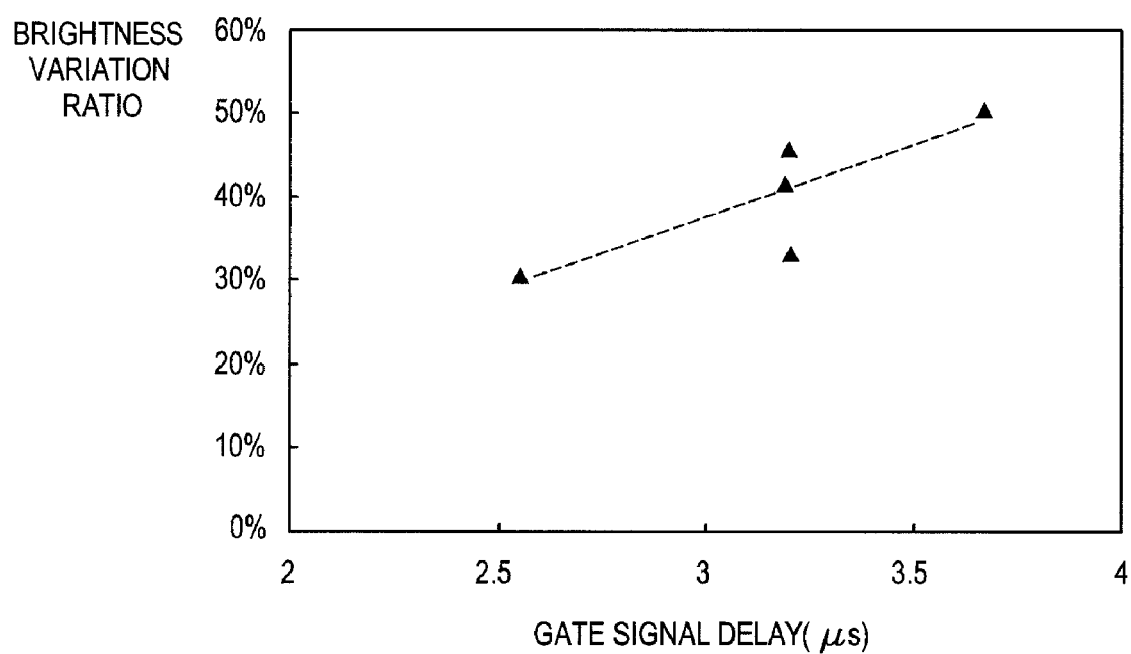
FIG. 10 illustrates a relation between delayed gate signals and brightness.

FIG. 10 illustrates a brightness variation ratio depending on the gate signal delay value in the display region. The brightness variation ratio is defined by the mathematical expression, BVR=(Brightness of the left display region− Brightness of central display region)/(Brightness of central display region)*100. Here, a large value means a large brightness difference.

As shown in the example of FIG. 10, if the gate signal delay value rises 43% (from 2.55 μs to 3.67 μs), the brightness variation ratio (BVR) increases around 64% (from 30.6% to 50.3%).

Figure 11:
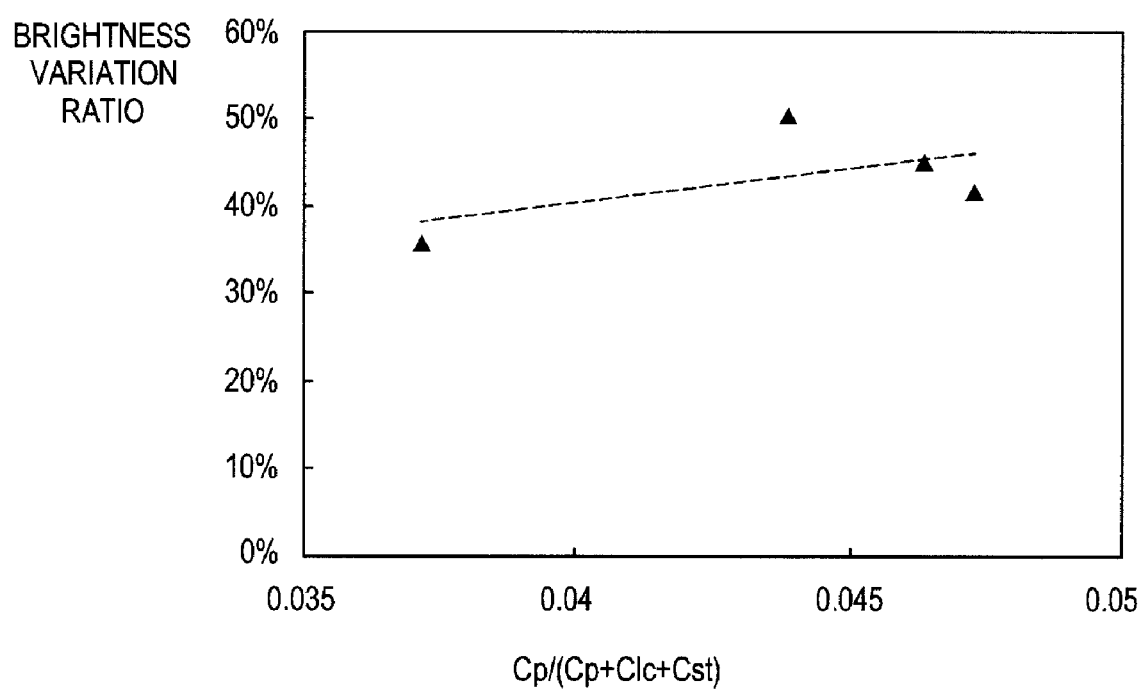
FIG. 11 illustrates a variation of a parasitic capacitance and brightness.

FIG. 11 illustrates a brightness variation ratio according to Cp/(Clc+Cst+Cp) in proportion to the kick back voltage. As shown therein, if Cp/(Clc+Cst+Cp) increases 24% (from 0.037 to 0.046), the brightness variation ratio rises approximately 26.4% (from 35.6% to 45%).

As shown in FIGS. 10 and 11, brightness irregularity (BVR) gets worse as variation in the gate signal delay value gets larger and/or as comparative contribution to kickback from the parasitic capacitance gets larger.

The comparative amount of gate signal delay relative to position of the pixel electrode can be made to vary by changing a compensating or ballasting resistance in the non-display region, i.e., a resistance from the gate pad to the gate main line, which will be described with reference to the examples of FIGS. 12 and 13.

As shown therein, the resistance in the non-display region was switched over the following four values: ⅙ kΩ, ⅓ kΩ, ½ kΩ and ⅔ kΩ. The bottom most data plot having 0 kΩ is the case where there is no ballasting resistor and a gate main line and a gate pad are integrally formed in the same layer.

Figure 12:
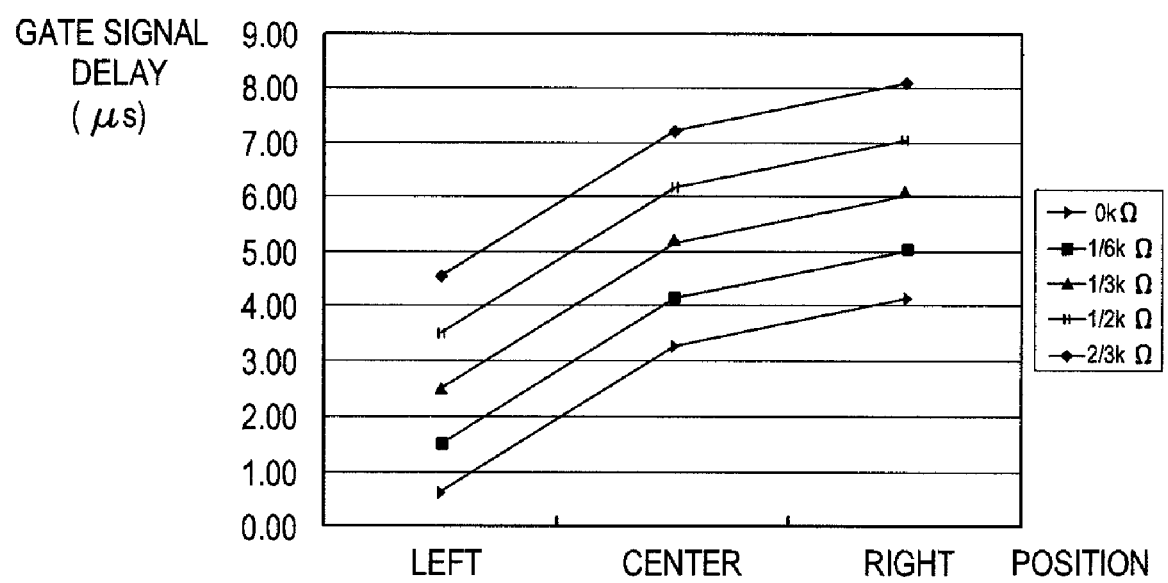
FIG. 12 illustrates a delay of the gate signal due to a resistance value of a resistor.

As shown in FIG. 12, the larger the resistance of the ballasting resistor in the non-display region was, the higher was the cumulative gate signal delay value when moving from the left side of the main line (closest to the gate pad) to the right side of the main line (farthest from the gate signal originating pad). If the resistance of the ballasting resistor in the non-display region becomes larger, the ratio of the right gate signal delay value over the left gate signal delay value decrease. In other words, change in brightness from left to right decreases.

If the resistance is 0 kΩ, the positional delay ratio, PDR= (right gate signal delay value)/(left gate signal delay value) is 6.53 (calculated from 4.18/0.64). Meanwhile, if the resistance is ⅔ kΩ, the PDR value is 1.77 (calculated from 8.12/ 4.57). Thus it is seen that PDR (the positional delay ratio) decreases substantially as the ballasting resistance becomes a more predominant factor in total line resistance seen between the gate pad and the gate electrode.

Figure 13:
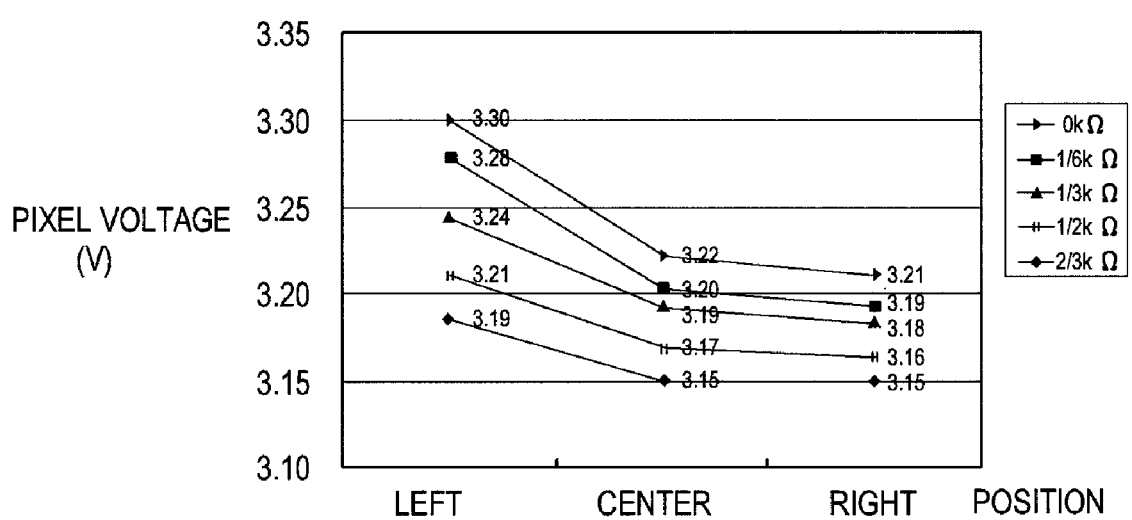
FIG. 13 illustrates a pixel voltage depending on the resistance value of the resistor.

As shown in FIG. 13, the larger the resistance of the ballasting resistor in the non-display region is, the smaller the overall pixel voltage is. As the resistance of the ballasting resistor becomes larger, the positional voltage ratio, PVR= (left pixel voltage)/(right pixel voltage) decreases. That is, if the resistance is 0 kΩ, the ratio, (left pixel voltage)/(right pixel voltage) is 1.028 (calculated from 3.3/3.21). if the resistance is ⅔ kΩ, the PVR is 1.012 (calculated from 3.19/3.15).

As shown in FIGS. 12 and 13, the increased resistance of the ballasting resistor in the non-display region decreases the positionally-related differences in the gate signal delay and the positionally-related differences in the pixel voltage between the left-side display region and the right-side display region. However, if the resistance of the ballasting resistor in the non-display region becomes larger, it also becomes more difficult to transmit a strong gate signal to each TFT. Thus, the resistance of the ballasting resistor should be determined as a compromise and in consideration of the total resistance of the gate main line 121.

Figure 14:
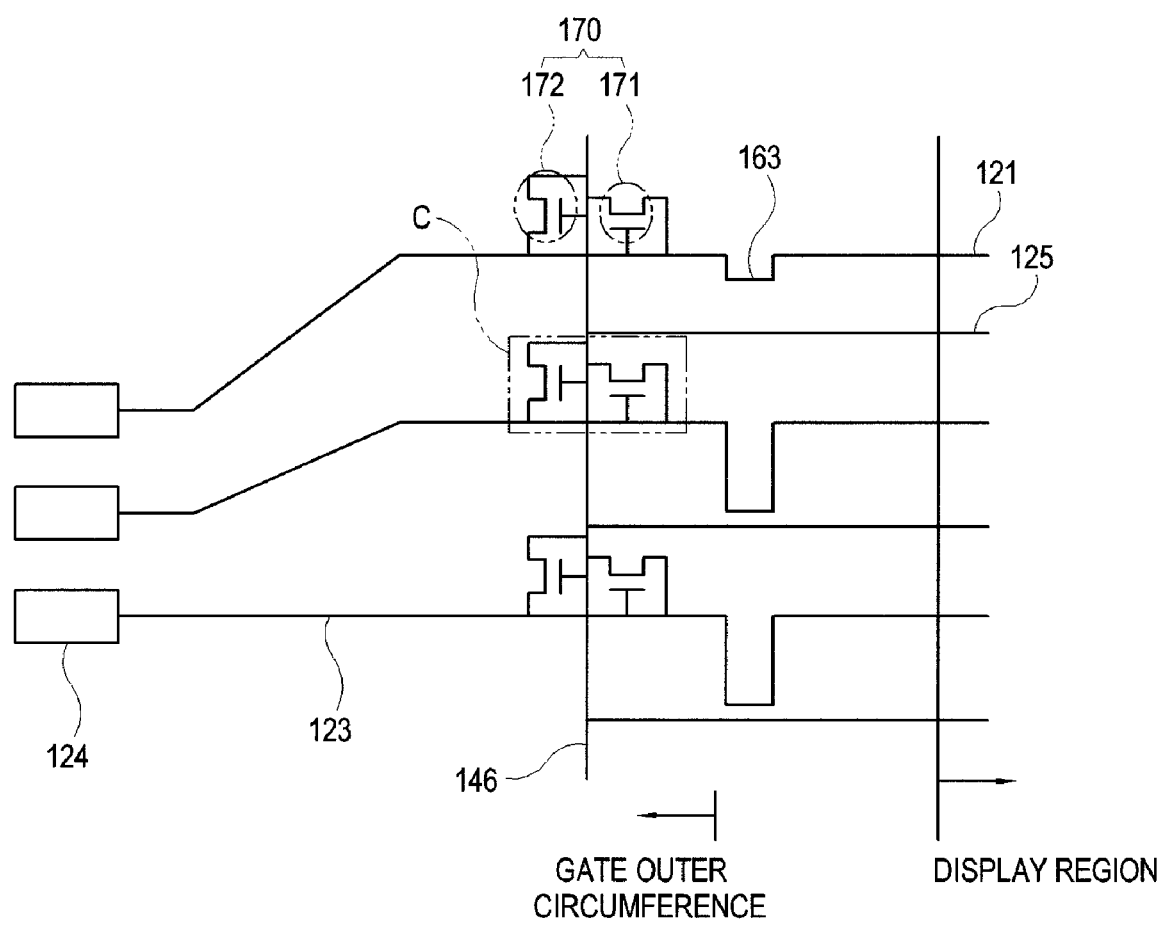
FIG. 14 illustrates a circuit diagram of main parts in a liquid crystal display device according to a second exemplary embodiment.
Figure 15:
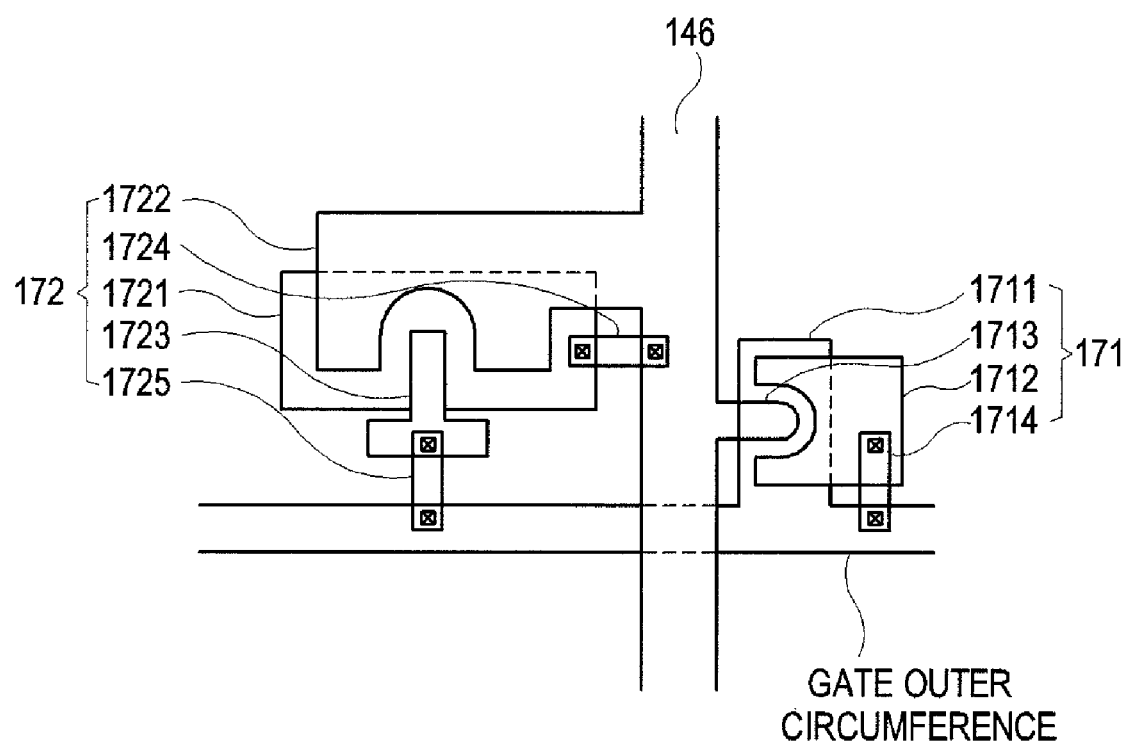
FIG. 15 is an enlarged view of a part C in FIG. 14.

Hereinafter, a liquid crystal display device according to a second exemplary embodiment of the present disclosure will be described with reference to FIGS. 14 and 15. FIG. 14 illustrates a part corresponding B area in FIG. 1.

As shown in FIG. 14, an anti-static set of diode-connected MOSFETs 170 is formed on an outer circumference portion of each ballasting resistor 163. The anti-static set 170 is electrically connected with a gate outer circumference and a common voltage line 146. If static electricity is introduced through a gate pad 124 during a manufacturing process, the resistor 163 having a large resistance may be damaged, thereby causing disconnection. However, the anti-static set of diode-connected MOSFETs 170 is activated when the absolute value of voltage of the static exceed a predefined threshold and the activated set 170 scatters the introduced static electricity to the common voltage line (e.g., ground) 146 to prevent the resistor 163 from being damaged. The gate outer circumference portion refers a gate wire connected with the gate main line 121 and formed outside of the resistor 163. That is, the gate outer circumference portion includes the gate pad 124 and the fan-out part 123.

In one embodiment, the anti-static diode means 170 includes a plurality of thin film MOSFET transistors. The anti-static diode means 170 includes a first diode-connected MOSFET 171 and a second diode-connected MOSFET 172 coupled for carrying differently directed current flows. The first diode-connected MOSFET 171 is provided so that a negative going current flows from the gate outer circumference to the common voltage line 146. The second diode-connected MOSFET 172 is provided so that a positive-going current flows from the common voltage line 146 to the gate outer circumference portion.

Hereinafter, an embodiment of the anti-static diode means 170 will be described in more detail with reference to FIG. 15. The common voltage line 146 serves as an electrostatic bar with respect to the anti-static diode means 170.

A control terminal (gate) 1711 and an input terminal (drain) 1712 of the first diode-connected MOSFET 171 are connected with each other and with the gate line outer circumference (121). An output terminal (source) 1713 of the first diode-connected MOSFET 171 is connected with the common voltage line 146. A bridge 1714 connects the input terminal (drain) 1712 to the gate outer circumference (121). If static electricity is inputted to the gate outer circumference and the static exceeds the predefined threshold (Vt) of MOSFET 171, the control terminal 1711 connected with the gate outer circumference is switched to a turned on state, MOSFET 171 becomes conductive and thereby diverts the static electricity to the common voltage line 146 connected with the output terminal 1713.

A control terminal (gate) 1721 and an input terminal (drain) 1722 of the second diode-connected MOSFET 172 are connected with the common voltage line 146. An output terminal (source) 1723 of the second diode-connected MOSFET 172 is connected with the gate outer circumference (121). A second bridge 1724 connects the common voltage line 146 and the control terminal 1721 while a third bridge 1725 connects the output terminal 1723 and the gate outer circumference. If static electricity is inputted to the gate outer circumference and the static exceeds the predefined threshold (Vt) of MOSFET 172, the control terminal 1721 connected with the gate outer circumference through the bridge 1724 is switched to a turned-on state, MOSFET 172 becomes conductive and thereby diverts the static electricity to the common voltage line 146 connected with the input terminal (drain) 1722.

In another exemplary embodiment, the anti-static diode means 170 may include only a first anti-static diode-connected MOSFET 171 without the second anti-static diode-connected MOSFET 172.

Hereinafter, a liquid crystal display device according to a third embodiment of the present disclosure will be described with reference to FIGS. 16 and 17.

A gate pad 164 and a fan-out part 165 according to the third embodiment are integrally formed in a same layer with the ballasting resistor 163. The gate pad 164 and the fan-out part 165 may include indium tin oxide (ITO) or indium zinc oxide (IZO). The resistor 163 is connected with a gate main line 121 through a contact hole 156. The gate pad 164 and the fan-out part 165 perform the same operation as the resistor 163 according to the first embodiment.

In one embodiment, the resistance of the ballasting resistor 163 is in inverse proportion to a distance between the corresponding gate main line 121 and the gate pad 164 as was the case for one version of the first embodiment. Thus, brightness irregularity due to a distance difference between the gate main line 121 and the gate pad 164 decreases.

Figure 16:
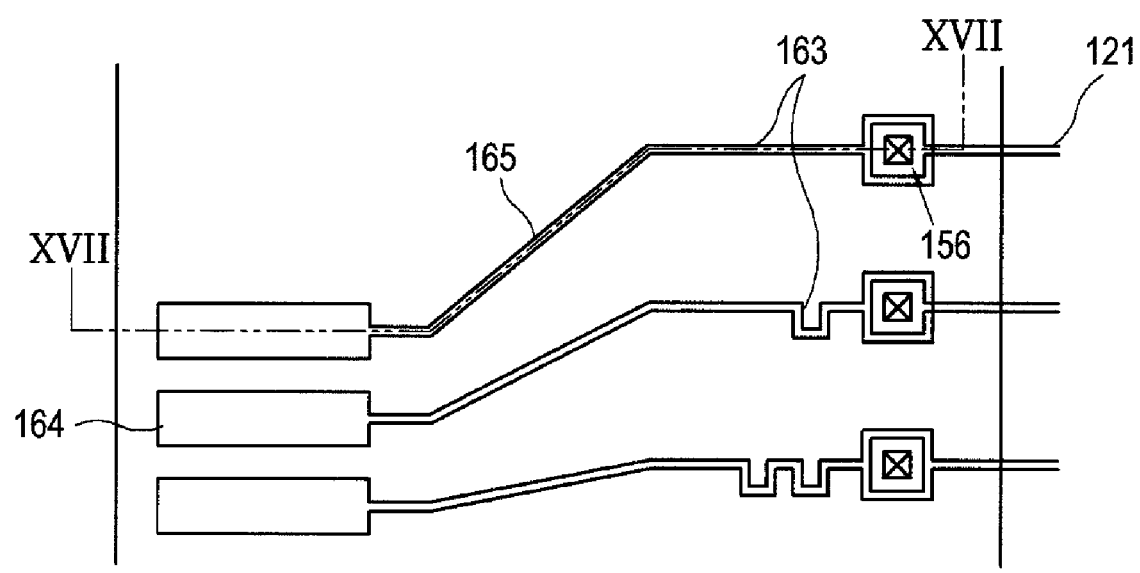
FIG. 16 illustrates a liquid crystal display device according to a third embodiment.
Figure 17:
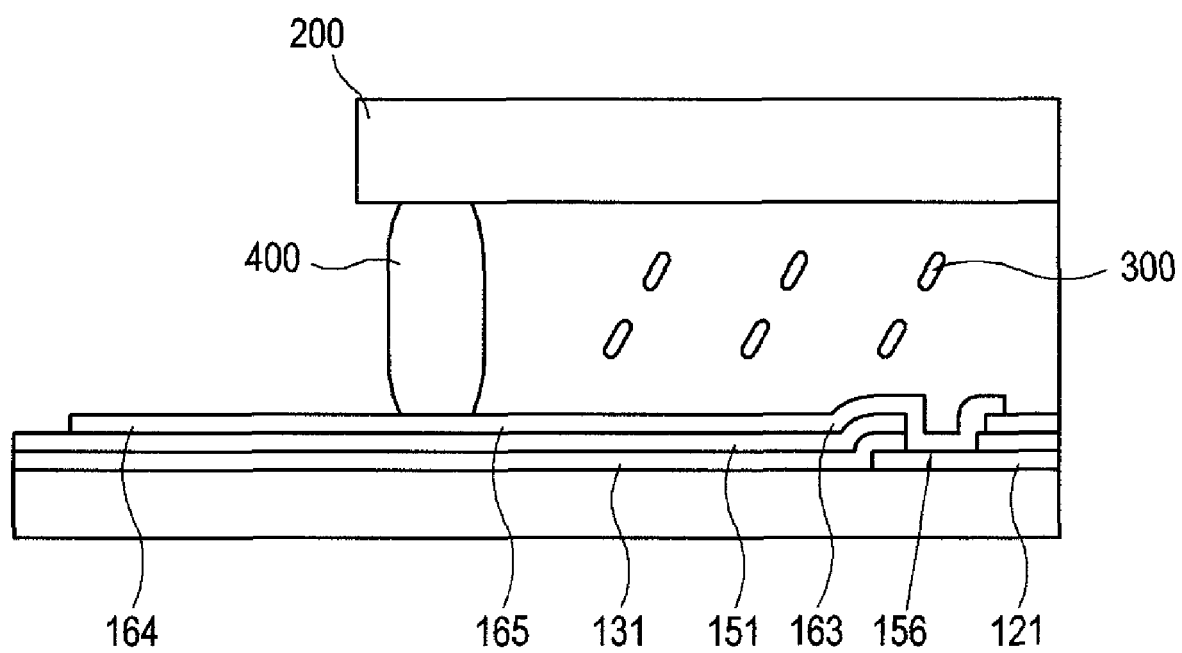
FIG. 17 is a sectional view, taken along line XVII-XVII in FIG. 16.

In another embodiment of the present disclosure, only a fan-out part 165 composed of a substantially resistive material such as indium tin oxide (ITO) or indium zinc oxide (IZO) may be provided to delay a corresponding gate signal, without forming a separate ballasting resistor 163 in the shape of the square waves such as shown in the lower two lines of FIG. 16.

A liquid crystal display device according to a fourth embodiment will be described with reference to FIGS. 18 to 20.

Figure 18:
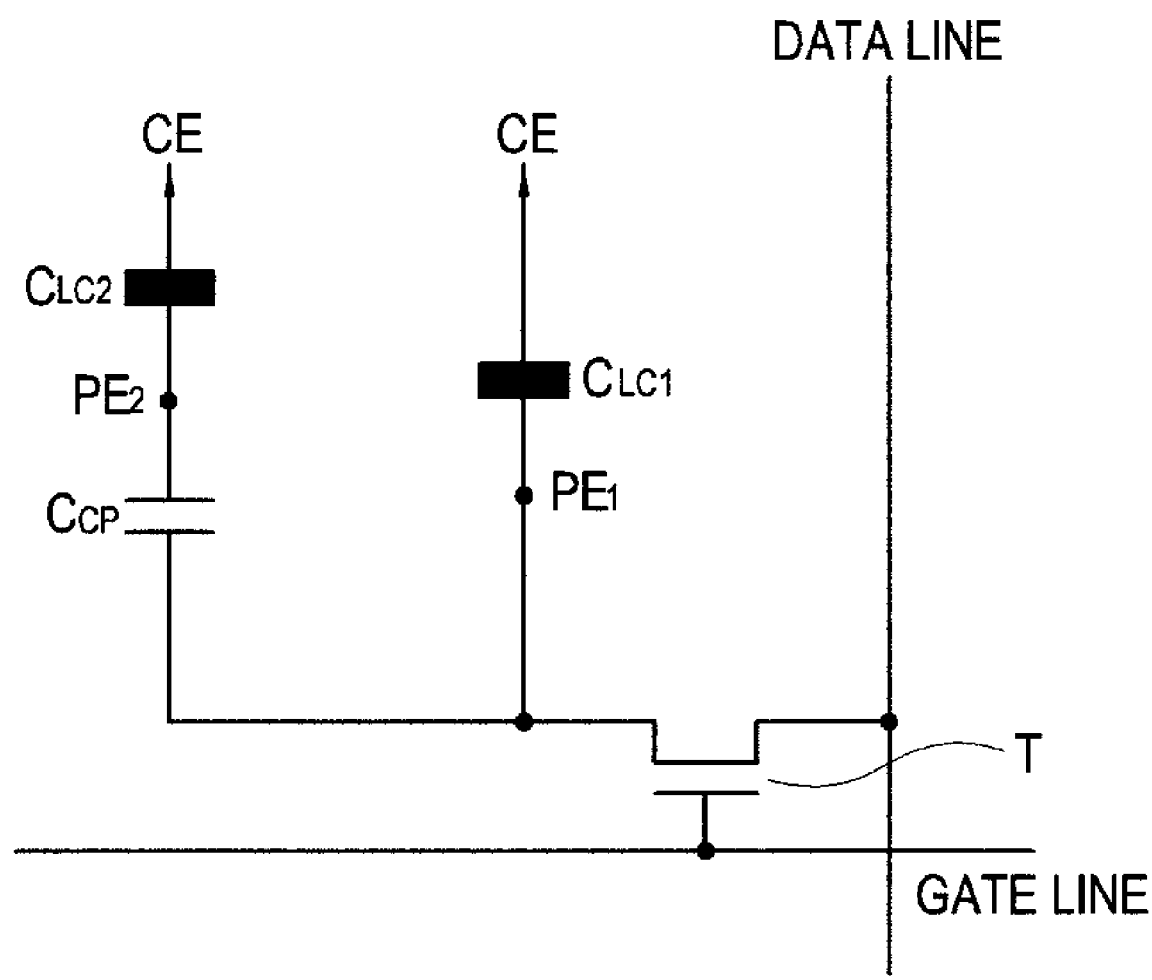
FIG. 18 is an equivalent circuit of a pixel in a liquid crystal display device according to a fourth embodiment.
Figure 19:
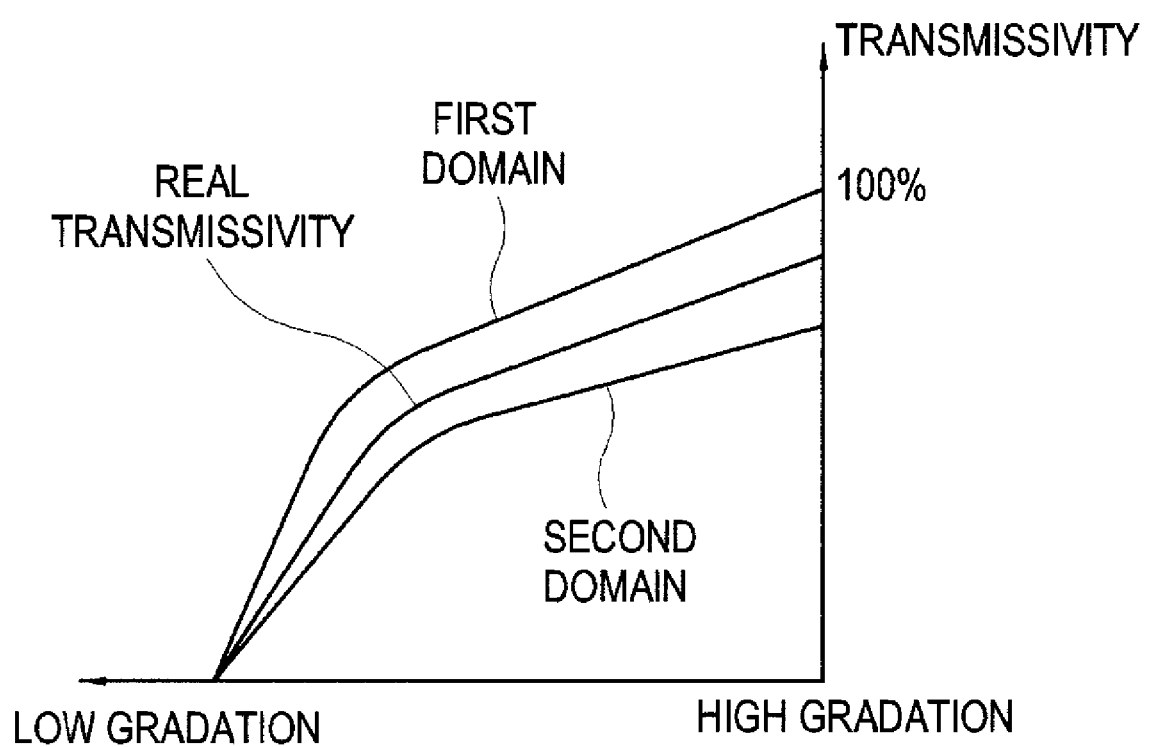
FIG. 19 illustrates a principle of improving visibility in the liquid crystal display device according to the fourth embodiment.

As shown in FIG. 18, a thin film transistor T is connected with two liquid crystal capacitances $C_{LC1}$ and $C_{LC2}$. The first liquid crystal capacitance $C_{LC1}$ is formed between a first pixel electrode PE1 and a common electrode CE. The first pixel electrode PE1 is directly connected with the thin film transistor T. The second liquid crystal capacitance $C_{LC2}$ is formed between the second pixel electrode PE2 and the common electrode CE. The second pixel electrode PE2 is indirectly connected with the thin film transistor T through a coupling capacitance $C_{CP}$.

Here, the first pixel electrode PE1 and the second pixel electrode PE2 are electrically separated from each other due to the presence of coupling capacitance $C_{CP}$ and the second liquid crystal capacitance $C_{LC2}$.

The liquid crystal display device according to the fourth embodiment can improve visibility per a mechanism which will be described with reference to FIG. 19.

The first pixel electrode PE1 receives a data signal through the thin film transistor T. Meanwhile, the second pixel electrode PE2 receives a data signal by a voltage through a coupling capacitance $C_{CP}$ formed in an insulating layer between the second pixel electrode PE and the thin film transistor T, instead of directly receiving the data signal from the thin film transistor T.

Thus, the second pixel electrode PE2 receives a weaker signal than the first pixel electrode PE1, thereby causing a difference in brightness of the pixel region corresponding to the first pixel electrode PE1 and the pixel region corresponding to the second pixel electrode PE2. In one embodiment, the voltage supplied to the second pixel electrode PE2 is 50% to 90% of the voltage supplied to the first pixel electrode PE1.

Thus, a single pixel has a plurality of regions that have different gamma curves. The brightness and color in a front and lateral parts are compensated to improve lateral visibility.

Figure 20:
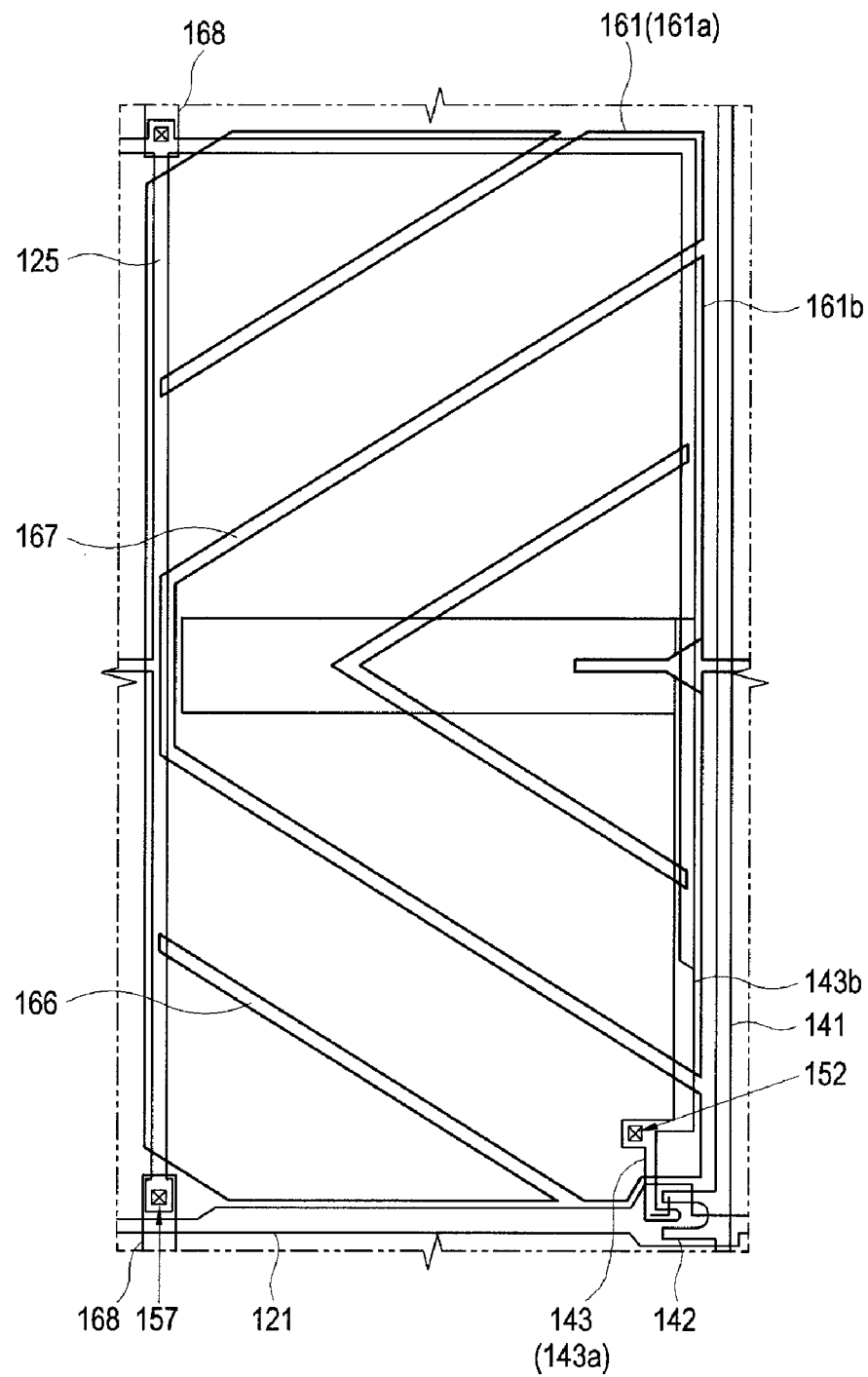
FIG. 20 illustrates an arrangement of the liquid crystal display device according to the fourth embodiment.

As shown in FIG. 20, the pixel electrode 161 includes a first pixel electrode 161*a* and a second pixel electrode 161*b* which are separated from each other by a pixel electrode separating pattern 167. The second pixel electrode 161*b* has a trapezoid shape whose three sides are surrounded by the first pixel electrode 161*a*. A pixel electrode cutting pattern 166 which is side by side with the pixel electrode separating pattern 167 is formed on the first and second pixel electrodes 161*a* and 161*b*.

A drain electrode 143 includes a first drain electrode 143*a* which is connected with the first pixel electrode 161*a* and supplies an electrical signal thereto and a second drain electrode 143*b* which extends below the second pixel electrode 161*b*. The second drain electrode 143*b* forms a coupling capacitance $C_{CP}$ together with the second pixel electrode 161*b*.

The pixel electrode separating pattern 167 and the pixel electrode cutting pattern 166 divide a liquid crystal layer 300 into a plurality of regions together with a common electrode cutting pattern 252.

A storage electrode line 125 is formed along the boundary of the pixel electrode 161. Upper and lower storage electrode lines 125 are connected with each other through a contact hole 157 and a bridge electrode 168.

Figure 21:
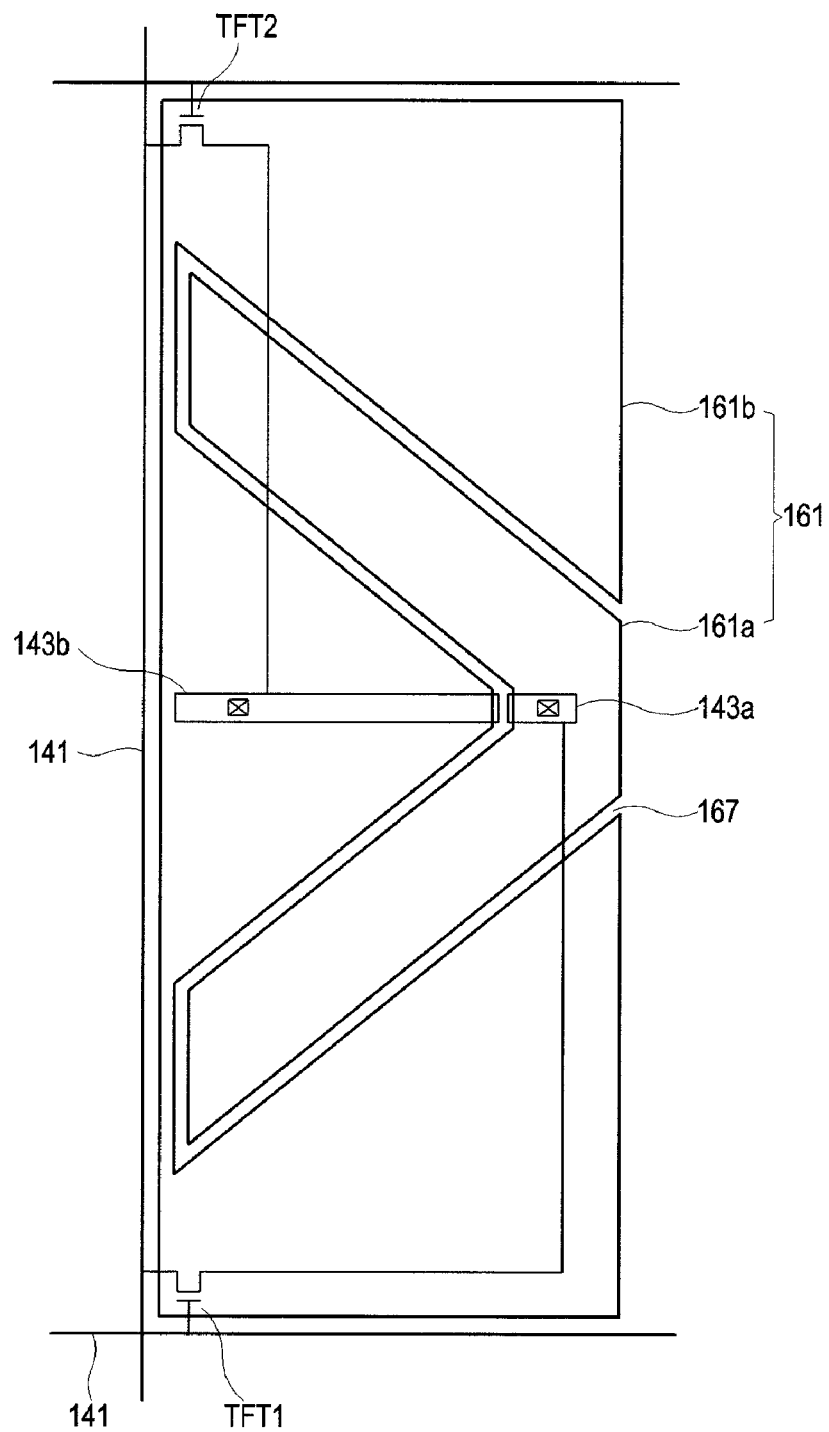
FIG. 21 illustrates an arrangement of a liquid crystal display device according to a fifth embodiment.

A liquid crystal display device according to a fifth embodiment of the present disclosure will be described with reference to FIG. 21.

A pixel electrode 161 has a rectangular shape as a whole. The pixel electrode 161 is elongated in an extension direction of a data line 141.

The pixel electrode 161 includes a first pixel electrode 161*a* and a second pixel electrode 161*b* which are separated from each other by a pixel electrode separating pattern 167. The first pixel electrode 161*a* is disposed in a center of a pixel and has a chevron-shape. The second pixel electrode 161*b* surrounds an inside, an upper part and a lower part of the first pixel electrode 161*a*. The second pixel electrode 161*b* is larger than the first pixel electrode 161*a*.

A thin film transistor T includes a first thin film transistor TFT1 which is connected with the first pixel electrode 161*a* and a second thin film transistor TFT2 which is connected with the second pixel electrode 161*b*.

A drain electrode 143 of the respective thin film transistors TFT1 and TFT2 overlaps the pixel electrode 161 to form a storage capacitance Cst. The storage capacitance Cst is proportional to an overlapping size of the drain electrode 143 and the pixel electrode 161.

In the fifth embodiment, respective pixel electrodes 161a and 161b receive different pixel voltages by using independent thin film transistors TFT1 and TFT2. The method of improving visibility in the fifth embodiment is the same as that in the fourth embodiment. Thus the detailed description will not be provided here.

The configuration of the non-display region in the fourth and fifth embodiments can be the same as that in the first to third embodiment of the present disclosure.

As the pixel electrode 161 is divided in the fourth and fifth embodiments, the liquid crystal capacitance Clc and the storage capacitance Cst are small. Thus, the kick back voltage Vkb becomes larger, thereby making the brightness difference (refer to Formula 1) more significant.

As described above, the present disclosure of invention provides a liquid crystal display device which reduces a brightness irregularity due to a gate signal delay difference.

Although a number of embodiments have been shown and described, it will be appreciated by those skilled in the art after studying the above that changes may be made in these embodiments without departing from the principles and spirit of the disclosure.

What is claimed is:

1. A liquid crystal display device comprising:
    a first substrate having a display region that includes a plurality of display sub-regions that are regularly spaced according to a first pitch dimension;
    a second substrate spaced apart from and facing the first substrate; and
    a liquid crystal material layer disposed between the first substrate and the second substrate,
    the first substrate comprising:
        a gate insulating layer and a passivation layer;
        a plurality of gate main lines each including a first conductive material having a respective first conductivity, each gate main line extending within a corresponding and mutually exclusive one of the display sub-regions, and each gate main line having a corresponding first end disposed within its corresponding display sub-region;
        a plurality of gate pads spaced according to a second pitch dimension smaller than the first pitch dimension, and disposed outside of the display region so as to be spaced apart from adjacent first ends of corresponding ones of the gate main lines inside the display region;
        a plurality of ballasting resistors each interposed between a corresponding gate pad and the first end of its corresponding gate main line,
        an electrostatic bar extending about a gate outer circumference; and
        a storage electrode line;
    wherein the ballasting resistors have their respective resistances predominantly defined by a second conductive material having a respective second conductivity that is less than the first conductivity of the first conductive material of the gate main lines; and
    wherein at least two of the ballasting resistors respectively have different resistances and different lengths, the length of each respective resistor being in inverse proportion to a linear distance between the first end of the corresponding gate main line and the corresponding gate pad;
    wherein each ballasting resistor comprises a same conductive material layer as included in the pixel electrodes layer, said material layer of each ballasting resistor also overlapping the passivation layer and the gate insulating layer,
    wherein the gate outer circumference is interposed between the gate pads and their corresponding ballasting resistors,
    wherein the gate outer circumference has an anti-static diode which is electrically connected to the electrostatic bar, and
    wherein the storage electrode line is formed within one of the display sub regions, so as to be elongated in parallel with the corresponding gate main line of that display sub region.

2. The liquid crystal display device according to claim 1, wherein the material layer of each of the ballasting resistors comprises indium tin oxide (ITO) or indium zinc oxide (IZO).

3. The liquid crystal display device according to claim 1, wherein the gate pads each include a respective portion of the same conductive material layer as included in the pixel electrodes layer and in the ballasting resistors, and where the display device further comprises comprising a plurality of fan-out parts each respectively interposed between a corresponding one of the gate pads and its respective ballasting resistor.

4. The liquid crystal display device according to claim 3, wherein the gate main lines, the gate pads and the fan-out part include a same gate electrode defining layer as is used to define the gate electrodes of the thin film transistors.

5. The liquid crystal display device according to claim 3, further comprising a sealant which is formed on the fan-out part and combines the first substrate and the second substrate.

6. The liquid crystal display device according to claim 1,
    wherein the first substrate further comprises a storage electrode line formed within one of the display sub-regions, so as to be elongated in parallel with the corresponding gate main line of that display sub-region, and
    wherein the first substrate further comprises a common voltage line which is connected to supply a common voltage to the storage electrode line, and the electrostatic bar comprises the common voltage line.

7. The liquid crystal display device according to claim 1,
    wherein the anti-static diode comprises a first anti-static diode-connected transistor having the gate outer circumference as a control terminal thereof and as an input terminal thereof, and the electrostatic bar as an output terminal thereof, and
    wherein the anti-static diode comprises a second anti-static diode-connected transistor having the gate outer circumference as an output terminal thereof, and has the electrostatic bar as a control terminal and an input terminal thereof.

8. The liquid crystal display device according to claim 1, wherein at least one of the ballasting resistors has a zigzag pattern.

9. The liquid crystal display device according to claim 1, wherein the liquid crystal layer is a vertical alignment mode liquid crystal layer.

10. The liquid crystal display device according to claim 9, wherein each of the pixel electrodes has a pixel electrode cutting pattern and the second substrate comprises a common electrode which is formed with a corresponding common electrode cutting pattern.

11. The liquid crystal display device according to claim 10, wherein each of the pixel electrodes comprises a first subpixel electrode and a second subpixel electrode which are separated from each other, and the first and second subpixel electrodes are connected so as to receive different pixel voltages.

12. The liquid crystal display device according to claim 11, wherein each of the thin film transistors comprises a drain electrode which comprises a first drain electrode supplying a data voltage directly to the first subpixel electrode and a second drain electrode forming a coupling capacitance together with the second subpixel electrode.

13. The liquid crystal display device according to claim 11, wherein each of the thin film transistors comprises a first thin film transistor which is connected with the first subpixel electrode and a second thin film transistor which is connected with the second subpixel electrode.

14. The liquid crystal display device according to claim 1, wherein a total resistance of each respective one of the ballasting resistors is 10% to 50% of a total resistance of the corresponding gate main line.

15. The liquid crystal display device according to claim 1, wherein resistance values of respective ones of the ballasting resistors are set so that a variation of gate signal delays due to resistance of the corresponding gate main lines is substantially less than gate signal delay due to resistances of the ballasting resistors.

16. A liquid crystal display device comprising:
a first substrate having a display area and a non-display area;
a second substrate facing the first substrate;
a liquid crystal layer disposed between the first substrate and the second substrate,
wherein the first substrate comprises:
a plurality of gate main lines disposed in the display area;
a plurality of gate pads disposed in the non-display area;
a plurality of ballasting resistors which each electrically connects a corresponding one end of a corresponding one of the gate main lines with a corresponding one of the gate pads, and where resistances of the respective ballasting resistors are predominantly defined by an incorporated first conductive material of the ballasting resistors that has a larger resistivity than that of a second conductive material incorporated in the gate main lines and predominantly defining resistances of the respective gate main lines, where the incorporated first conductive material is part of a same material layer as used to define respective contactable portions of respective gate pads;
an electrostatic bar extending about a gate outer circumference; and
a storage electrode line;
wherein at least two of the ballasting resistors respectively have different resistances and different lengths, the length of each respective resistor being in inverse proportion to a linear distance between the one end of the corresponding gate main line and the corresponding gate pad;
a plurality of thin film transistors each connected with a corresponding gate main line; and
a plurality of pixel electrodes each electrically connected with a corresponding one of the thin film transistors and each incorporating the same first conductive material as that of the ballasting resistors and that of the gate pads,
wherein the liquid crystal layer is a vertically aligned (VA) mode liquid crystal layer,
wherein the gate outer circumference is interposed between the gate pads and their corresponding ballasting resistors,
wherein the gate outer circumference has an anti-static diode which is electrically connected to the electrostatic bar, and
wherein the storage electrode line is formed within one of the display sub regions, so as to be elongated in parallel with the corresponding gate main line of that display sub region.

17. A liquid crystal display (LCD) having a matrix of pixel areas and comprising:
a plurality of pads to which terminals of a driver circuit can connect so as to supply respective gate pulsing signals to the pads;
a plurality of gate signal carrying lines each overlapping both of a gate insulating layer of the LCD and a passivation layer of the LCD, the gate signal carrying lines each fanning out from a respective one of the pads and each having a first length portion whose resistance is predominantly defined by a first conductive material, where the first length portion extends to operatively couple with a corresponding plurality of pixel control transistors distributed along the first length portion of the gate signal carrying line;
one or more ballasting resistors integrally provided in line with a corresponding one or more of the gate signal carrying lines, where each ballasting resistor is of a sufficiently large resistance to reduce brightness disparity between pixel areas of its corresponding gate signal carrying line that are located closest to and furthest away from the respective pad as measured along the length of the corresponding gate signal carrying line, where the resistances of the ballasting resistors are predominantly defined by a second conductive material having a conductivity that is less than a conductivity of the first conductive material,
an electrostatic bar which extends about a gate outer circumference; and
a storage electrode line;
wherein the incorporated second conductive material is part of a conductive layer that overlaps both of the gate insulating layer and the passivation layer, where the same conductive layer defines respective contactable portions of respective gate pads; and
wherein at least two of the ballasting resistors are respectively of different resistance values and different lengths, the length of each respective resistor being in inverse proportion to a linear distance measured between an adjacent end of the corresponding gate main line and the corresponding gate pad,
wherein the gate outer circumference is interposed between the gate pads and their corresponding ballasting resistors,
wherein the gate outer circumference has an anti-static diode which is electrically connected to the electrostatic bar, and
wherein the storage electrode line is formed within one of the display sub regions, so as to be elongated in parallel with the corresponding gate main line of that display sub region.

* * * * *